Figure 1:
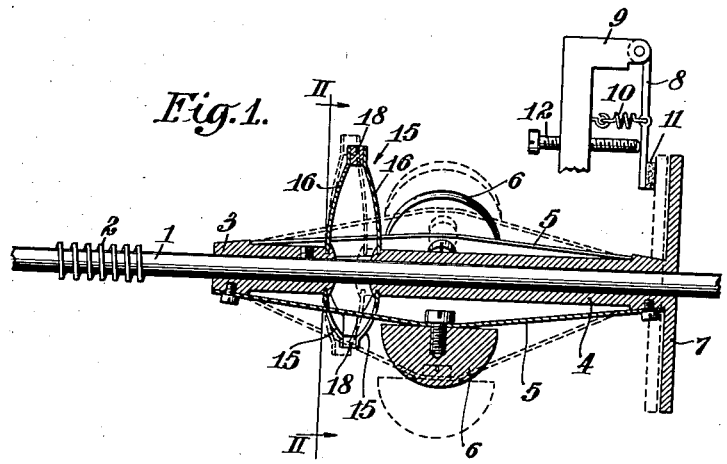

Dec. 15, 1936.                J. A. BRIGGS                2,064,779
                          SPEED CONTROL DEVICE
                          Filed May 16, 1934

INVENTOR:
Joseph A. Briggs,
BY Goldsborough
ATTORNEY.

Patented Dec. 15, 1936

2,064,779

UNITED STATES PATENT OFFICE 2,064,779

SPEED CONTROL DEVICE

Joseph A. Briggs, Erlton, N. J., assignor to Radio Corporation of America, a corporation of Delaware Application May 16, 1934, Serial No. 725,869

11 Claims. (Cl. 188—187)

This invention relates to speed control devices, and more particularly to a centrifugal governor of the type having a rotary friction disc movable axially along the governor shaft in accordance with the speed of rotation of the governor balls.

In governors of this type, torque is transmitted to the friction disc from the governor shaft through a plurality of flat spring members connecting the shaft and the disc and carrying weights or balls which move radially outwardly from the governor shaft as the speed thereof increases, and vice versa, thereby moving the friction disc axially along the governor shaft. By applying a friction member or stop to the friction disc at a predetermined point in its movement along the governor shaft, further advancement thereof is prevented. This prevents further radial travel of the governor balls and the governor then rotates at a fixed, predetermined speed.

Perhaps the most serious objection to a governor of this sort is that the torque is transmitted through the fly-ball springs. When the governor is driven hard, this tends to distort the springs and, in conjunction with the load applied on the disc, causes the fly-balls to oscillate, wherefore the action of the governor is not uniform.

The primary object of my invention is to provide an improved centrifugal governor of the type set forth wherein torque is transmitted from the governor shaft to the friction disc independently of the fly-ball springs.

Another object of my invention is to provide an improved centrifugal governor wherein torque is transmitted in the manner set forth without deleteriously affecting the operation of the fly-ball springs or other parts of the governor.

Still another object of my invention is to provide an improved centrifugal governor that will insure uniform speed of the parts controlled thereby irrespective of possible irregularities in the cooperative parts of the governor mechanism.

A still further object of my invention is to provide an improved governor of the type set forth which will be durable and efficient in use, which is simple and inexpensive of manufacture, and which can be controlled in its action with great ease.

In accodance with my invention, I provide a resilient coupling between the sleeve which is fixed to the governor shaft and the movable sleeve on the governor shaft to which the friction disc is fixed, the fly-ball springs also connecting these two sleeves. The resilient coupling member may be in the form of a spider with its arms extending radially outwardly from the governor shaft, but whereas the fly-ball springs are pliant in said radial direction, the spiders are rigid circumferentially of the governor shaft and are pliant only in a direction axially of the governor shaft. Accordingly, torque can be effectively transmitted from the fixed sleeve on the governor shaft to the movable sleeve and friction disc through the resilient spider coupling without distorting the fly-ball springs or otherwise affecting their operation.

Figure 2:
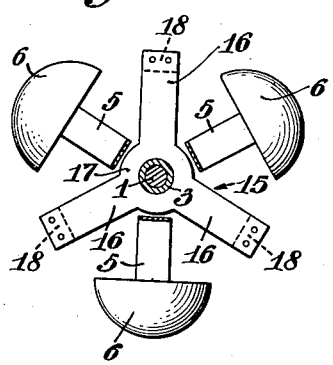

The novel features that I consider characteristic of my invention are set forth with particularity in the appended claims. The invention itself, however, together with additional objects and advantages thereof will best be understood from the following description of a specific embodiment thereof when taken in connection with the accompanying drawing, in which Figure 1 is a central sectional view of my improved governor showing the idle position of the parts in solid lines and an operating position thereof in dotted lines, and Figure 2 is a sectional view on the line II—II of Figure 1, looking in the direction of the arrows.

Referring to the drawing more in detail, there is shown a governor shaft 1 which may be journalled in suitable bearings and which receives power from a motor (not shown) through a worm 2 thereon. Mounted on the shaft 1 in axially spaced relation are a pair of sleeves 3 and 4, the sleeve 3 being fixed to the shaft and the sleeve 4 being loose thereon for movement along said shaft toward and away from the fixed sleeve 3. A plurality of flat springs 5 couple the sleeves 3 and 4 and carry the usual masses or fly-balls 6, the springs 5 being resilient so as to be pliant in a direction radially of the shaft 1 and being disposed substantially parallel to the shaft 1 when the governor is idle.

Fixed to the movable sleeve 4 is a friction disc 7 which rotates therewith and moves axially along the shaft 1 with the sleeve 4 when the shaft rotates and the fly-balls 6 move radially outwardly away from the shaft under the influence of centrifugal force developed therein. A lever 8 pivoted to a fixed bracket member or the like 9 and constrained toward said bracket member by a spring 10 carries a friction pad 11 of leather, felt or the like which is engaged by the friction disc 7 in its axial movement along the shaft 1 and which serves to limit the extent of movement of the disc 7 and sleeve 4 along the shaft, thereby fixing the speed of the governor and the parts controlled thereby. A set screw 12 may be adjusted to locate the friction pad 11 in any desired position whereupon a desired speed of the governor may be attained.

The governor mechanism thus far described constitutes a more or less conventional governor. As pointed out heretofore, an objection to such conventional governors is that torque is transmitted from the sleeve 3 to the sleeve 4 and the disc 7 entirely through the resilient strips or springs 5. When the governor is not driven hard, the pressure between the disc 7 and the friction pad 11 is relatively slight and the braking force which tends to make sleeve 4 run behind the sleeve 3 is comparatively small and, perhaps, insufficient to overcome the stiffness of the springs 5 in a direction circumferentially about the shaft 1. Hence, the springs 5 suffer very little distortion and the governor works quite satisfactorily. However, when the governor is driven hard, the braking force applied by the pad 11 on the disc 7 is materially greater and the tendency of the sleeve 4 to run behind the sleeve 3 is much greater. The result is that the springs 5 suffer distortion circumferentially of the shaft 1, the masses or flyweights 6 begin to oscillate, and the action of the governor is highly irregular.

To overcome this difficulty, I have provided an additional coupling between the sleeves 3 and 4. This coupling may take the form of a pair of spiders 15, each having a plurality of arms 16 extending radially outwardly from a central hub portion 17 and receiving between them the resilient strips 5, and each spider 15 being secured to one of the sleeves 3 and 4 at their adjacent ends, preferably, although not necessarily, by peening the reduced ends of the sleeves over the hub portions 17, as clearly shown in Figure 1. The spiders 15 may be made of thin stock, for example, phosphor bronze of about 0.0055'' in thickness and the adjacent arms 16 of the two spiders are united at their extremities, as by means of bakelite or similar inserts 18. The spiders 15 are extremely stiff in a direction circumferentially about the shaft 1, wherefore they are adapted to transmit torque from the sleeve 3 directly to the sleeve 4 without suffering distortion in said circumferential direction. By relieving the springs 5 of the necessity of transmitting torque from the sleeve 3 to the sleeve 4, it will be seen that the springs 5 are freed from distortion circumferentially about the shaft 1, and the fly-weights are not subjected to oscillation. The material of the spiders 15 is such that, although they are stiff in the direction heretofore indicated, they are pliant or flexible axially of the shaft 1. This permits free and smooth operation of the governor at all times, the spiders 15 approaching each other as the weights 6 fly outwardly and separating as the fly-weights 6 and springs 5 approach their innermost, or idle, position.

My invention is especially applicable to motors such as are used in moving picture cameras and projectors, phonographs, etc., but is not, of course, limited thereto.

Although I have shown only one specific embodiment of my invention, I am fully aware that many modifications thereof are possible. For example, the sleeve 4 may be keyed to the sleeve 3 or to the shaft 1 for direct transmission of torque, but the specific embodiment hereinbefore described is preferred because it adds no friction to the system. Other modifications will, no doubt, also suggest themselves to those skilled in the art. My invention, therefore, is not to be limited except insofar as is necessitated by the prior art and by the spirit of the appended claims.

I claim as my invention:

1. In a governor, a driving element, a driven element, and a coupling between said elements, said coupling being stiff in a direction circumferentially about said elements but being pliant in a direction axially of said elements.

2. In a governor, a driving element, a driven element coaxial therewith but axially spaced therefrom, and a torque transmitting coupling between said elements, said coupling being stiff in a direction circumferentially about said elements but being pliant in a direction axially of said elements.

3. In a governor, a driving shaft, a sleeve fixed to said shaft, a second sleeve loose on said shaft and spaced from said first named sleeve, and a torque transmitting coupling between said sleeves, said coupling being stiff in a direction circumferentially about said shaft but being pliant in a directon axially of said shaft whereby said loose sleeve is free to move axially along said shaft relative to said fixed sleeve while being adapted to receive torque directly from said fixed shaft.

4. In a governor, the combination of a driving element, a driven element and a plurality of couplings between said elements, one of said couplings being pliant in a direction axially of said elements and another of said couplings being pliant in a direction radially of said elements.

5. In a governor, the combination of a driving element, a driven element, and a plurality of couplings between said elements, said couplings being relatively stiff in a direction circumferentially of said elements, but one of said couplings being pliant in a direction axially thereof and another of said couplings being pliant in a direction radially of said elements.

6. In a governor, the combination of a driving shaft, a sleeve fixed to said shaft, a second sleeve loose on said shaft and spaced from said first named sleeve, and a plurality of couplings between said sleeves, one of said couplings being substantially normal to said shaft and another of said couplings being substantially parallel to said shaft, said normal coupling being pliant axially of said shaft but stiff in a direction circumferentially about said shaft whereby torque may be transmitted therethrough from said fixed sleeve to said loose sleeve without distorting said other coupling.

7. In a governor, the combination of a driving shaft, a sleeve fixed to said shaft, a second sleeve loose on said shaft and spaced from said first named sleeve, and a pair of couplings between said sleeves, one of said couplings comprising a pair of spiders each secured to one of said respective sleeves at their adjacent ends and lying in planes substantially normal to said shaft, the arms of said spiders extending radially from said shaft and being united at their extremities, and the other of said couplings comprising a plurality of resilient strips disposed circumferentially about said sleeves and lying between the radial arms of said first coupling, said strips being substantially parallel to said shaft when the governor is idle and being secured, at each end, to one of said sleeves.

8. The invention set forth in claim 7 characterized in that said spider coupling is stiff in a direction circumferentially of said shaft, whereby torque may be transmitted therethrough from said fixed sleeve to said loose sleeve without distorting said resilient strips in the same direction.

9. The invention set forth in claim 7 characterized in that each of said resilient strips has a mass secured thereto and characterized further in that said strips are pliant in a direction radially of said shaft while said spider coupling is pliant axially of said shaft but is stiff in a direction circumferentially thereof whereby torque may be transmitted through said spider coupling from said fixed sleeve to said loose sleeve without distorting said resilient strips in said circumferential direction, yet permitting said strips to flex in response to the centrifugal force developed in said masses upon rotation of said shaft.

10. The invention set forth in claim 7 characterized in that said spider coupling is stiff in a direction circumferentially of said shaft, whereby said spider coupling is adapted to transmit torque from said fixed sleeve to said loose sleeve without necessitating distortion of said resilient strips in the same direction, and characterized further by the addition of a mass on each of said resilient strips, by the addition of a disc on said loose sleeve, and an adjustable stop member adapted to coact with said disc to limit the movement of said loose sleeve axially along said shaft in response to the centrifugal force developed in said masses upon rotation of said shaft.

11. In a governor, a driving element, a driven element in axial alignment therewith, and a coupling between said elements extending radially away from the axis of said elements, said coupling being stiff in a direction circumferentially about said elements but being pliant in a direction axially of said elements.

JOSEPH A. BRIGGS.